United States Patent [19]

Nakane et al.

[11] Patent Number: 5,148,285
[45] Date of Patent: Sep. 15, 1992

[54] IMAGE DISPLAY APPARATUS WITH INCREASED RASTER SCAN RATE OF LASER BEAMS

[75] Inventors: Yasuaki Nakane, Miyagi; Senri Miyaoka, Kanagawa; Sakuya Tamada, Tokyo; Hiroshi Nakayama, Miyagi; Junichi Iwai, Tokyo; Shuichi Igarashi, Miyagi, all of Japan

[73] Assignee: Sony Corporation, Tokyo, Japan

[21] Appl. No.: 452,614

[22] Filed: Dec. 15, 1989

[30] Foreign Application Priority Data

Dec. 21, 1988 [JP] Japan .................. 63-322698
Dec. 22, 1988 [JP] Japan .................. 63-324557

[51] Int. Cl.$^5$ .............................................. H04N 5/74
[52] U.S. Cl. .................................... 358/231; 358/60; 358/63; 359/217
[58] Field of Search ............. 358/231, 60, 63, 62, 358/233, 205, 206, 237; 350/68; 250/563

[56] References Cited

U.S. PATENT DOCUMENTS

| | | | |
|---|---|---|---|
| 3,597,536 | 8/1971 | Fowler | 358/231 |
| 3,721,756 | 10/1973 | Baker | 358/231 |
| 3,813,140 | 5/1974 | Knockeart | 358/205 |
| 3,818,129 | 6/1974 | Yamanoto | 358/60 |
| 3,828,124 | 8/1974 | Baum | 358/205 |
| 3,894,182 | 7/1975 | Yamamoto et al. | 358/231 |
| 3,973,826 | 8/1976 | Lobb | 358/206 |
| 4,054,360 | 10/1977 | Oosaka et al. | |
| 4,299,438 | 11/1981 | Minoura | |
| 4,433,894 | 2/1984 | Hanson et al. | |
| 4,621,891 | 11/1986 | Noguchi | 30/6.2 |
| 4,714,956 | 12/1987 | Yin | 358/60 |

FOREIGN PATENT DOCUMENTS

0014548A3 8/1980 European Pat. Off.
0177174A1 4/1986 European Pat. Off.
3028319A1 2/1981 Fed. Rep. of Germany.

Primary Examiner—James J. Groody
Assistant Examiner—Glenton B. Burgess
Attorney, Agent, or Firm—Philip M. Shaw, Jr.

[57] ABSTRACT

An image display apparatus having light beam sources for generating light beams, an optical modulator for modulating the light beams by image signals to be projected, a deflection device for deflecting the modulated light beams, the deflection device including a polygon mirror and an auxiliary reflection mirror provided near the polygon mirror such that the modulated light beams are reflected from the polygon mirror to said auxiliary reflection means and back toward the polygon mirror, a device for supplying the modulated light beams to the polygon mirror with predetermined angles relative to a rotational plane of the polygon mirror, such that the modulated light beams incident upon the polygon miror are reflected a plurality of times by the polygon mirror, and a projection device for projecting the modulated and deflected light beams from the deflection device on a screen or the like.

11 Claims, 15 Drawing Sheets

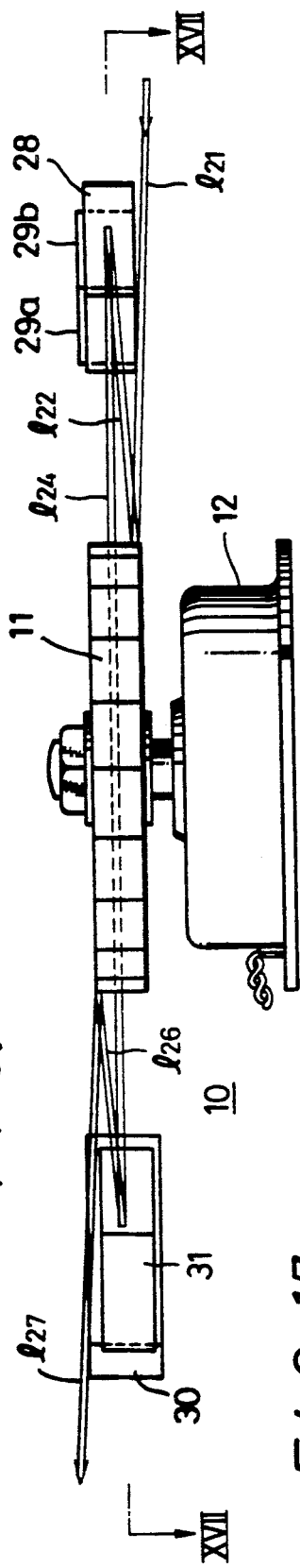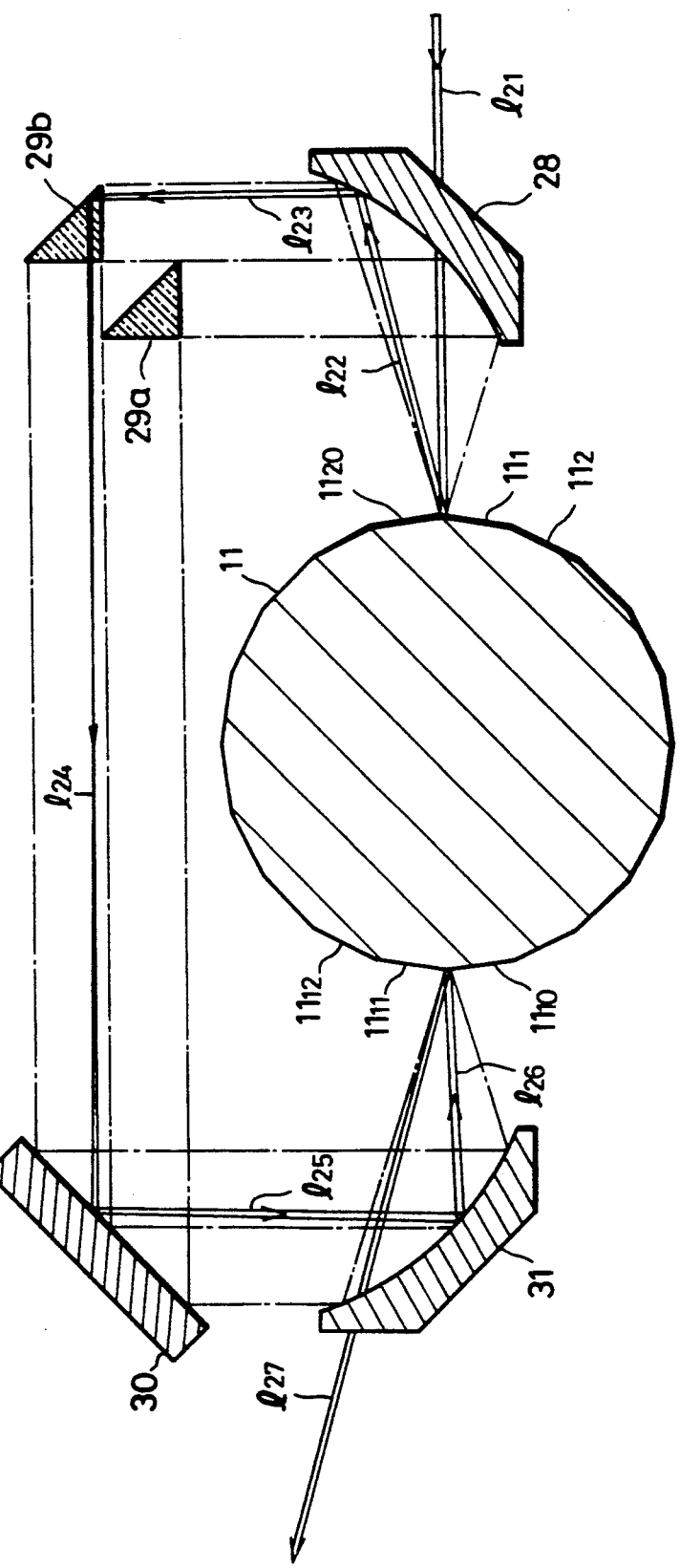

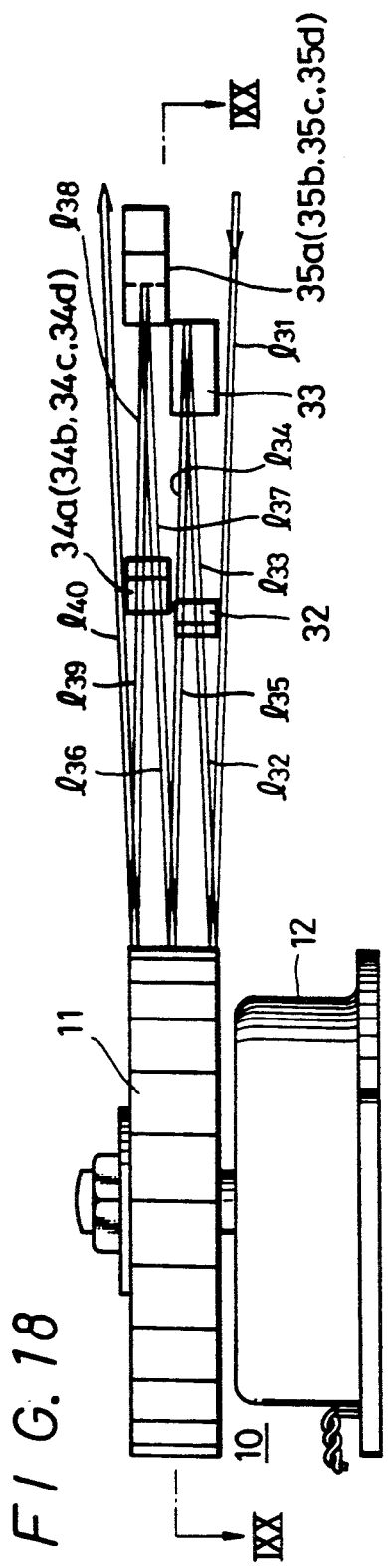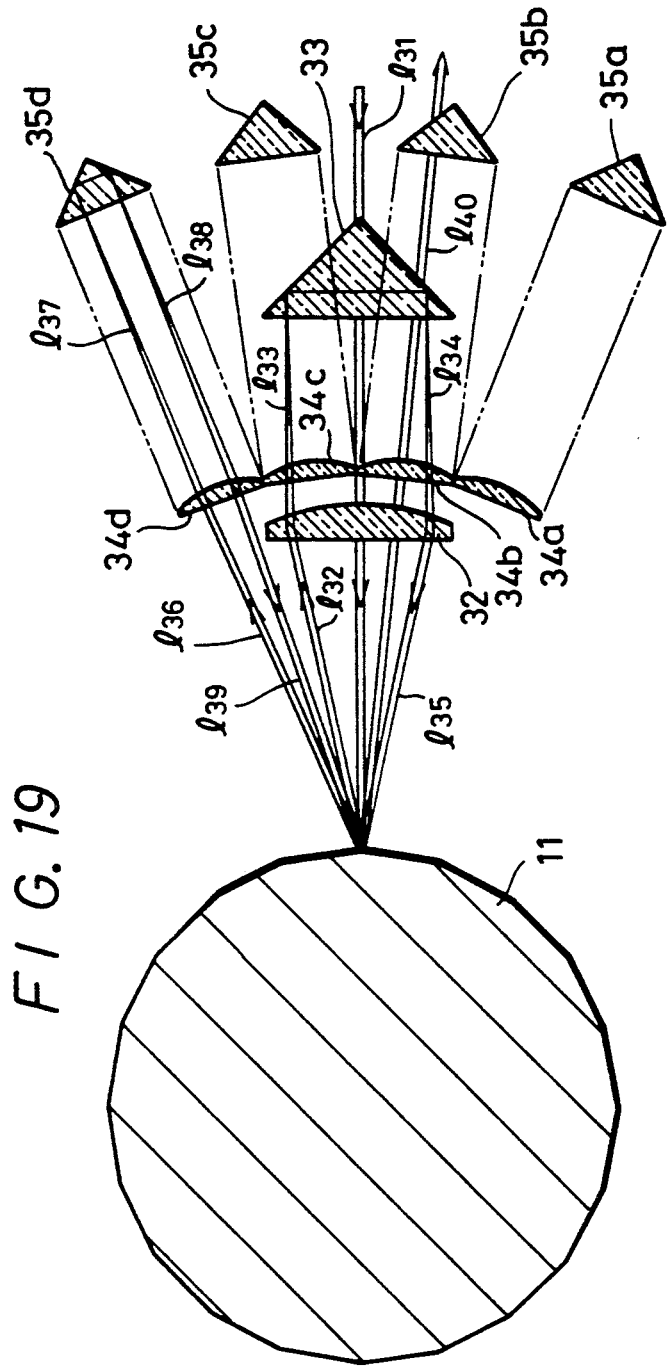

IMAGE DISPLAY APPARATUS WITH INCREASED RASTER SCAN RATE OF LASER BEAMS

BACKGROUND OF THE INVENTION

1. Field of the Invention

The present invention relates generally to an image display apparatus and, more particularly, is directed to an image display apparatus for displaying an image by the raster-scanning of laser beams.

2. Description of the Prior Art

In order to better understand the present invention, a previously proposed projection-type video display apparatus (see Japanese Utility Model Laid-Open Gazette No. 56-152456) is first explained with reference to FIG. 1.

Referring to FIG. 1, there are provided laser light sources 1a and 1B such as a semiconductor laser, gas laser and the like. A red laser light beam from the laser light source 1a is introduced to an optical modulator 2a. A green laser light beam and a blue laser light beam from the laser light source 1b are introduced into a dichroic mirror 3a, in which they are separated to provide a green laser light beam and a blue laser light beam. The green laser light beam is introduced to an optical modulator 2b, whereas the blue laser light beam is introduced through a reflection prism 4a to an optical modulator 2c. Modulation signals corresponding to three primary color signals, provided as video signals of an image to be displayed, are supplied to the optical modulators 2a, 2b and 2c, respectively. The optical modulators 2a, 2b and 2c are adapted to modulate intensities of the red, green and blue laser light beams on the basis of the modulation signals. The laser light beams derived from the optical modulators 2a, 2b and 2c are respectively supplied to lenses 5a, 5b and 5c for adjusting the diameters of the beams. The blue laser light beam from the lens 5c is introduced through a reflection prism 4b to a dichroic mirror 3b, and the green laser light beam from the lens 5b is introduced to other mirror face of the dichroic mirror 3b, whereby the blue and green laser light beams are mixed. The laser light beam thus mixed is introduced to a dichroic mirror 3c, and the red laser light beam from the lens 5a is introduced to the other mirror face of the dichroic mirror 3c, thereby obtaining a mixed laser light beam of three primary color beams. This mixed laser light beam is made incident on a reflection portion 11 of a polygon mirror 10.

In the polygon mirror 10, the reflection portion 11 is formed of flat mirrors arranged with an equal spacing in an annular fashion. This annular reflection portion 11 is rotated at high speed by some suitable drive means such as a motor and the like. The flat mirrors forming the reflection portion 11 form, for example, a regular icosipentahedron and deflect the laser light beam incident on the respective flat mirrors. FIGS. 2A and 2B illustrate the deflected states of the laser light beam.

As, for example, shown in FIG. 2A, when a laser beam lin becomes incident on an end portion of a flat mirror $11_1$ of the reflection portion 11 by the rotation, a laser beam lout is reflected toward the downward portion as shown in FIG. 2A. With the rotation of the reflection portion 11, the incident angle of the laser beam lin to the flat mirror $11_1$ gradually changes, and thereby the outgoing direction of the reflected laser beam lout changes upwardly. As shown in FIG. 2B, when the reflection portion 11 is rotated by an angle $\theta_1$ to cause the laser beam lin to become incident on the other end portion of the flat mirror $11_1$, a laser beam lout' is reflected toward the upper portion of FIG. 2B. In that event, the angle $\theta_2$ between the laser beam lout and the laser beam lout' becomes the deflection angle by the flat mirror $11_1$. Other flat mirrors of the reflection portion 11 deflect the laser beams by similar deflection angles so that, when the reflection portion 11 is formed of 25 flat mirrors, the laser beam is deflected 25 times per rotation of the reflection portion 11.

Referring back to FIG. 1, the laser beam reflected on the polygon mirror 10 is introduced through a projection lens 6 to a galvano mirror 7. This galvano mirror 7 is rotated by a drive source 7a. When the galvano mirror 7 is rotated at a predetermined interval by the drive source 7a, the laser beam from the polygon mirror 10 is deflected at a predetermined deflection angle during a predetermined interval. In this case, the deflection direction of the polygon mirror 10 and the deflection direction of the galvano mirror 7 are selected to be perpendicular to each other. The deflection by the polygon mirror 10 corresponds to the horizontal position on a screen 9 in the television receiver, whereas the deflection by the galvano mirror 7 corresponds to the vertical position on the screen 9 in the television receiver.

The laser beam reflected by the galvano mirror 7 is reflected by a reflection mirror 8 and becomes incident on the rear surface of the screen 9. Upon use, the viewer can see an image, formed by the laser beams, from the front surface of the screen 9.

Horizontal and vertical scanning periods of the video signal for forming the modulation signals supplied to the optical modulators 2a, 2b and 2c are synchronized with the deflection period by the polygon mirror 10 and the deflection period by the galvano mirror 7, whereby the image based on the video signal is displayed on the screen 9 by the raster-scanning of the laser beams. Thus, an image of one field is displayed on the screen 9 during one field period of the video signal, and hence, the display apparatus shown in FIG. 1 is operated as a projection type video display apparatus.

Next consider how the display apparatus thus constructed is operated in practice. For example, when a video signal having 1125 horizontal scanning lines such as a high definition television signal is displayed, the polygon mirror having 25 flat mirrors has to be rotated at 81000 r.p.m., which requires a special drive motor and a bearing for such very high speed rotation. If the polygon mirror is rotated at such high speed, then the flat mirrors of the polygon mirror also move at high speed, which is undesirable from a safety standpoint.

In order to solve the above-noted problems, one could attempt to decrease the rotation speed of the polygon mirror by increasing the number of the flat mirrors formed on the reflection portion of the polygon mirror. This proposal is not practical for several reasons:

If the diameter of the rotating portion of the polygon mirror is increased, then a centrifugal force applied to the reflection portion of the polygon mirror will increase, thereby causing an elastic strain on the mirror surface. Thus, the raster-scanning of laser beams is disturbed, and a motor having a large torque is needed, which is not practical.

Further, if the number of the flat mirrors is increased without changing the diameter of the rotating portion of the polygon mirror, then the area of one flat mirror will decrease, reducing the deflection angle from the standpoint of a beam spot of a laser beam, which is also not practical.

The above-noted problem will be explained more fully. For example, the flat mirror formed on each plane of the polygon mirror having a pentacontane reflection surface and a diameter of 40 cm has a width of 2.5 mm. When a laser light beam having a diameter of 1 mm becomes incident on the above-mentioned polygon mirror, if the laser beam becomes incident on adjacent planes at the boundary portion of the flat mirrors, then a so-called eclipse will occur. Consequently, part of the respective end portions of each plane ½ mm at each end are unusable, i.e. 40% of each plane cannot be used. Thus, only 60% of the plane can be effectively utilized, and the deflection angle becomes very small, which is not practical.

Furthermore, if the size of the beam spot of the laser beam is reduced, then the resolution of an image displayed will be degraded. Therefore, it is not possible to reduce the unusable area by reducing the beam spot of the laser beam.

In order to solve the above-mentioned problem, the following proposal is made, and this proposal will be explained with reference to FIG. 3.

As shown in FIG. 3, a laser light beam from a laser light source 1 is made incident on the reflection portion 11 of the polygon mirror 10 in the direction perpendicular to the rotation axis of the polygon mirror 10 and at an angle relative to the reflection portion 11 of the polygon mirror 10. The laser beam reflected by the reflection portion 11 is reflected by a fixed flat mirror 13 so as to become incident on the reflection portion 11 of the polygon mirror 10 one more time so that this reflected laser beam is introduced to a light path substantially behind the polygon mirror 10. Thus, when the reflection portion 11 of the polygon mirror 10 is rotated by, for example, $\Delta\omega$, if the fixed flat mirror 13 is not provided and the laser beam is reflected one time, then the deflection angle of the reflected laser beam will become $\alpha 1$. If the fixed flat mirror 13 is provided and the laser beam is reflected twice on the reflecting portion 11, then the deflection angle will be doubled to $\alpha 2$. As described above, if the fixed flat mirror 13 is provided, then the deflection angle of each plane of the polygon mirror 10 will be so extended. Thus, the number of flat mirrors forming the reflecting portion 11 can be increased without varying the radius of the polygon mirror 10.

In the example of FIG. 3, however, as the positional relationship between the primary incident point a and the secondary incident point b on each flat mirror or plane of the reflecting portion 11 is changed with the rotation of the polygon mirror 10, it happens that the secondary incident point b is on the adjacent flat mirror rather than on the same mirror as the primary incident point a. FIG. 4 shows how the loci of the incident points a and b are changed with time. As shown in FIG. 4, when the primary incident point a approaches an end portion of the predetermined plane $11_1$ of the reflecting portion 11, the secondary incident point b changes to the adjacent plane $11_2$ as shown by an arrow to thereby disturb the deflection angle.

As shown in FIG. 5, in another prior art apparatus the incident angle of the laser light beam from the laser light source 1 is inclined from the perpendicular direction of each plane of the reflecting portion 11 by a very small inclination angle and the primary and secondary incident angles are provided close to each other, thereby preventing the reflected light beam from the fixed flat mirror 13 from being moved toward the adjacent plane. However, in this apparatus, a reflected light beam deflected can not reach the interval S which is a rear side of the flat mirror 13, and the laser light beam is interrupted in this interval S by the flat mirror 13.

OBJECTS AND SUMMARY OF THE INVENTION

Accordingly, it is a general object of the present invention to provide an improved image display apparatus which can eliminate the defects encountered with the prior art.

More specifically, it is an object of the present invention to provide an image display apparatus in which the deflection angle of a polygon mirror can be increased considerably.

It is another object of the present invention to provide an image display apparatus in which the rotation speed of the polygon mirror can be decreased.

According to an aspect of the present invention, there is provided an image display apparatus comprising:

(a) light beam sources for generating light beams;

(b) modulation means for modulating said light beams by image signals to be projected;

(c) deflection means for deflecting said modulated light beams, said deflection means including polygon mirror means and auxiliary reflection means provided near said polygon mirror means for reflecting the modulated light beams from said polygon mirror means toward said polygon mirror means;

(d) means for supplying said modulated light beams to said polygon mirror means with a predetermined angle relative to a rotational plane of said polygon mirror means, thereby said modulated light beams incident upon said polygon mirror means being reflected a plurality of times by said polygon mirror means; and (e) projection means for projecting said modulated and deflected light beams from said deflection means on a screen or the like.

The above, and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIG. 16 is a schematic front view illustrating a second modified example of the second embodiment of the present invention;

FIG. 17 is a cross-sectional view taken through the line XVII to XVII of FIG. 16;

FIG. 18 is a schematic front view illustrating a main portion of the image display apparatus according to a third embodiment of the present invention;

FIG. 19 is a cross-sectional view taken through the line IXX to IXX of FIG. 18.

DETAILED DESCRIPTION OF PREFERRED EMBODIMENTS

Figure 1:
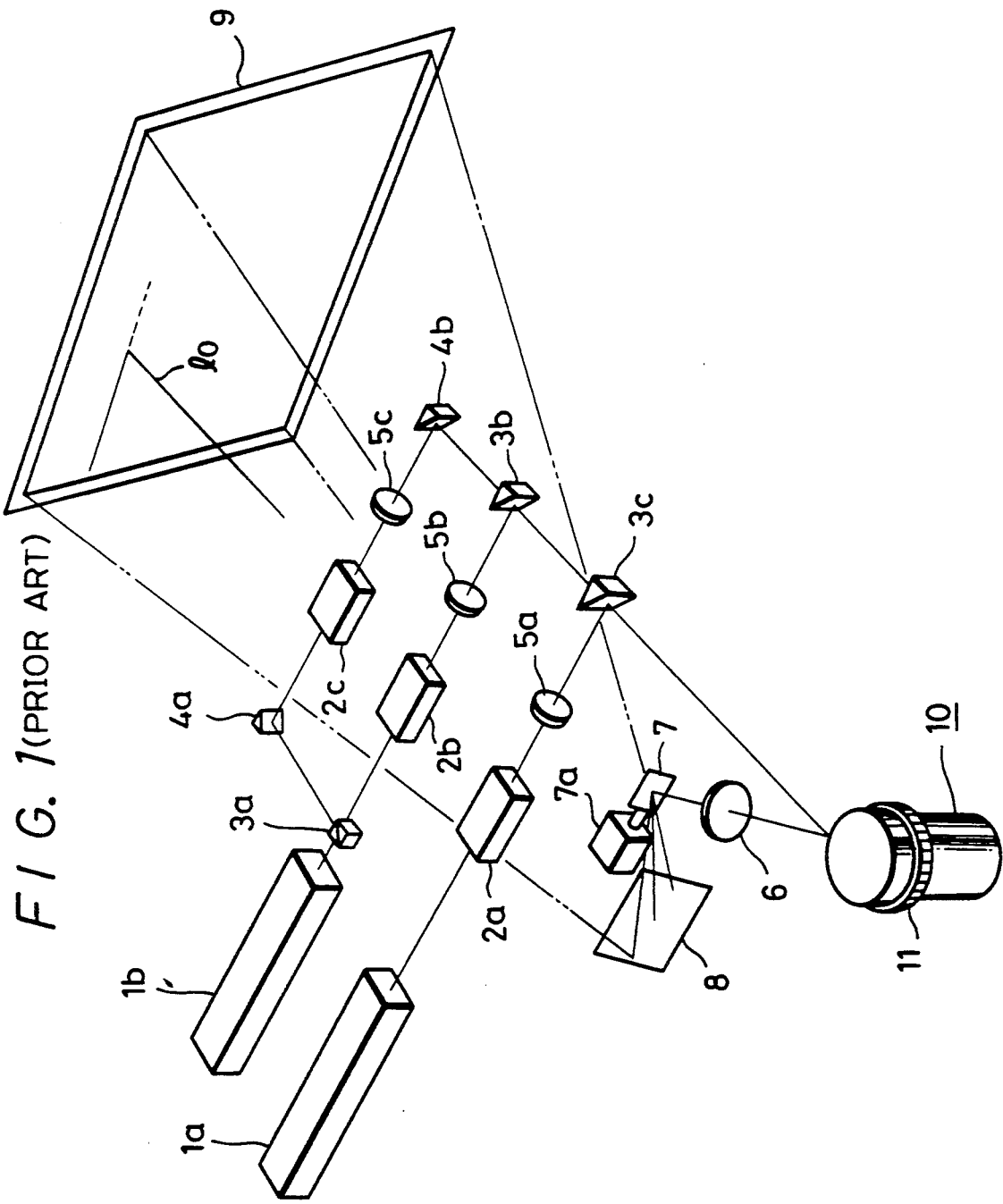
FIG. 1 is a perspective view illustrating an example of a prior-art projection-type video display apparatus.
Figure 2A:
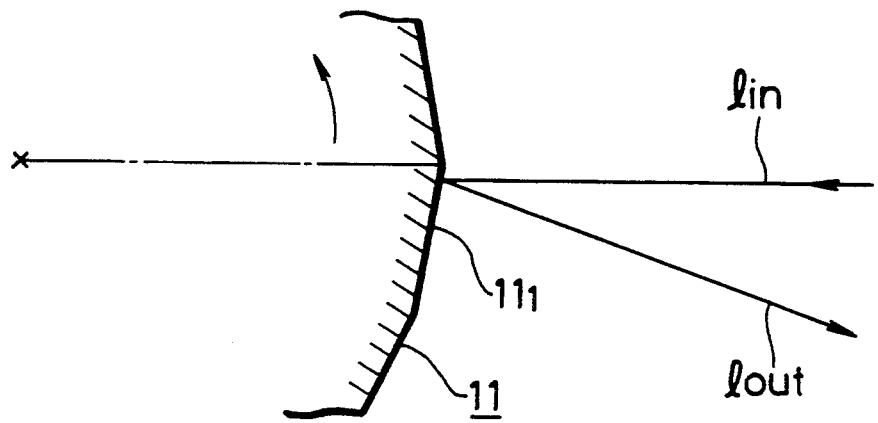
FIGS. 2A and 2B are schematic diagrams of a reflecting portion and laser beams, of a prior art projection type video display apparatus.
Figure 2B:
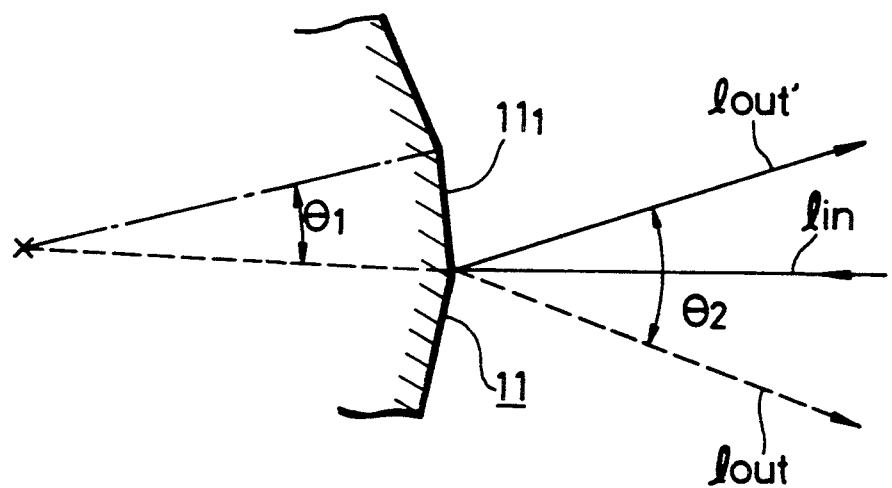
Figure 3:
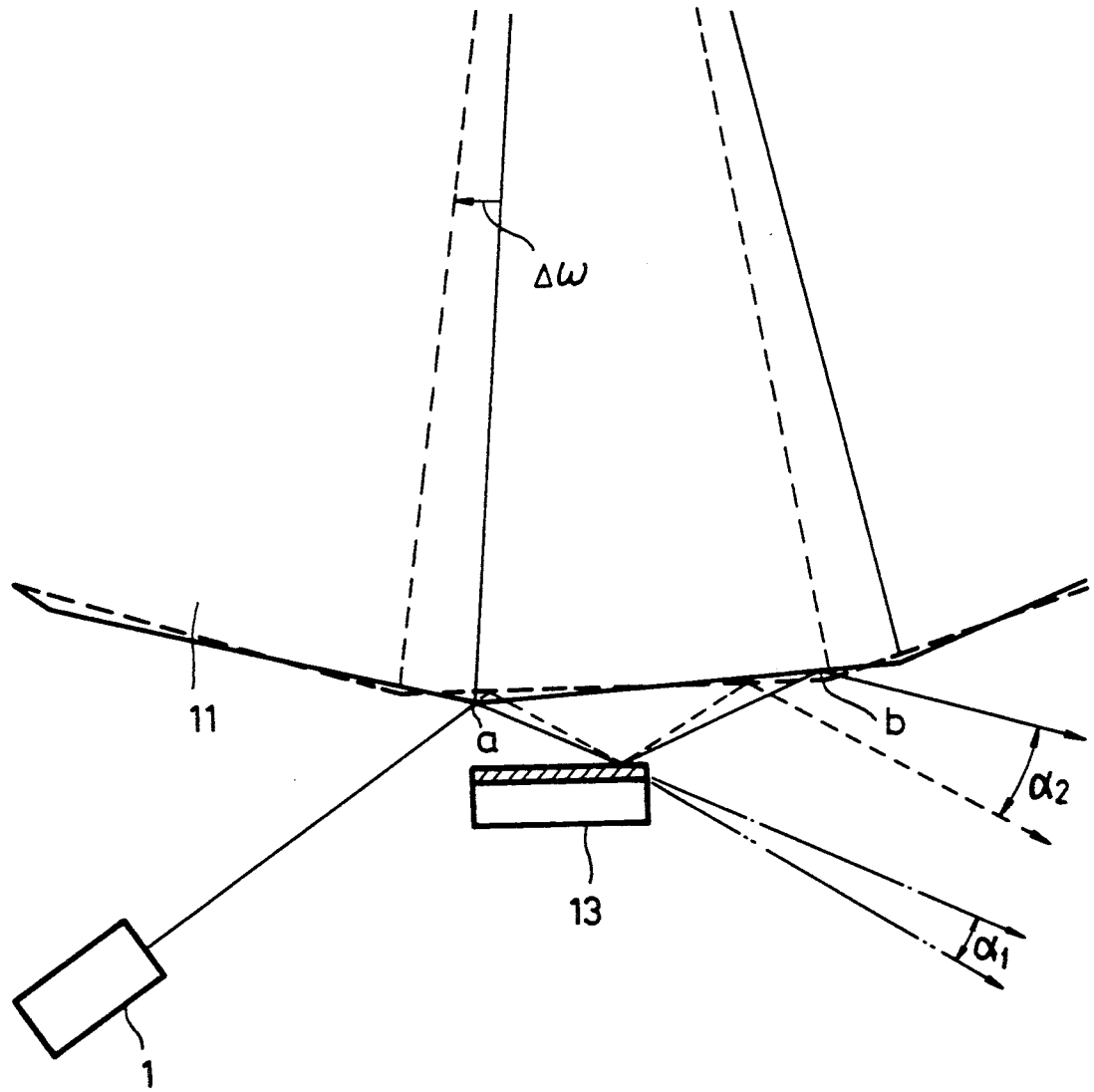
FIG. 3 is a schematic diagram of a reflecting portion and laser beams of a second prior-art projection-type video display apparatus.
Figure 4:
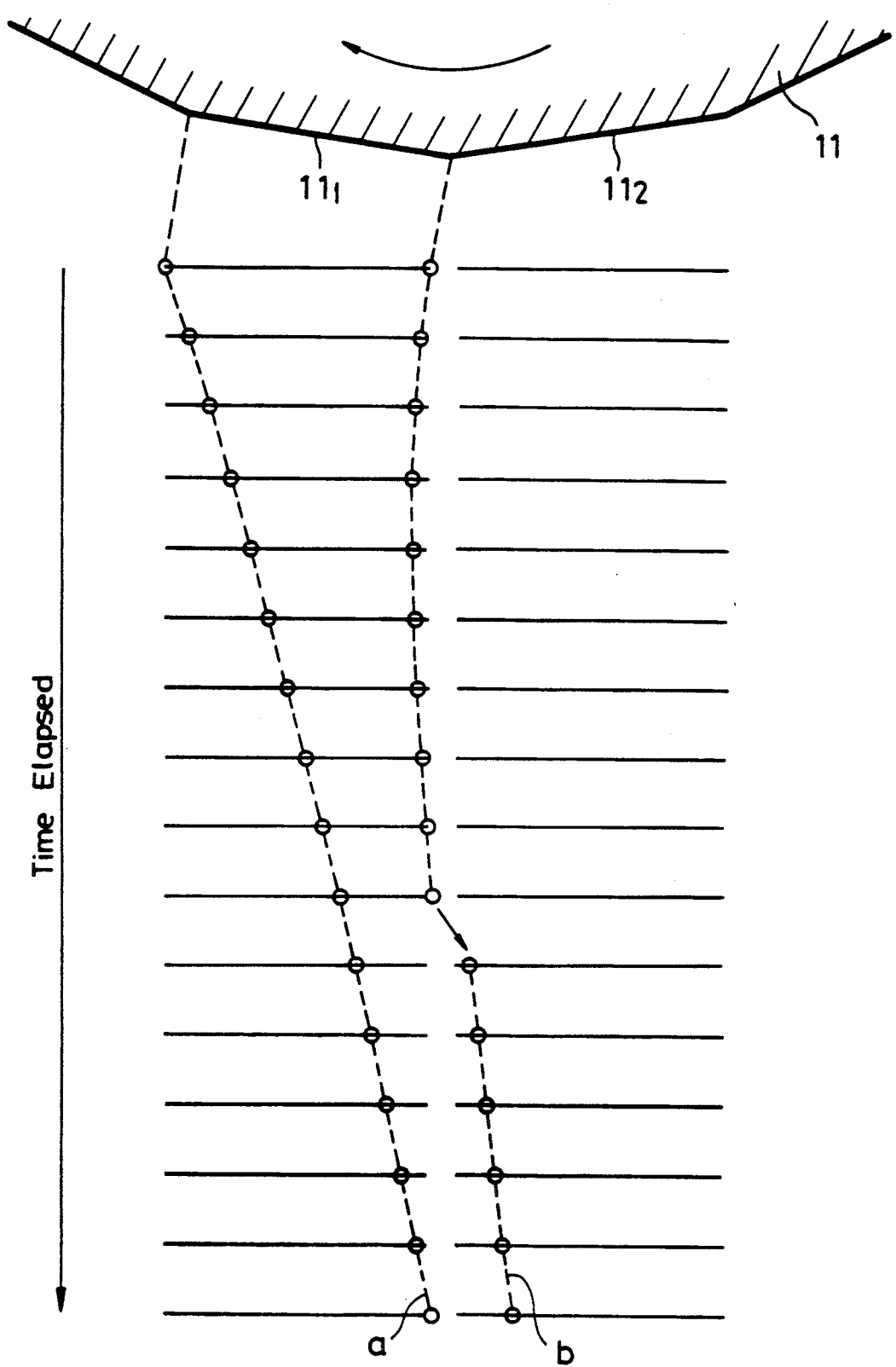
FIG. 4 is a schematic diagram of the loci of the incident points of the laser beam and how they are changed with time, in the operation of the second prior-art image display apparatus.
Figure 5:
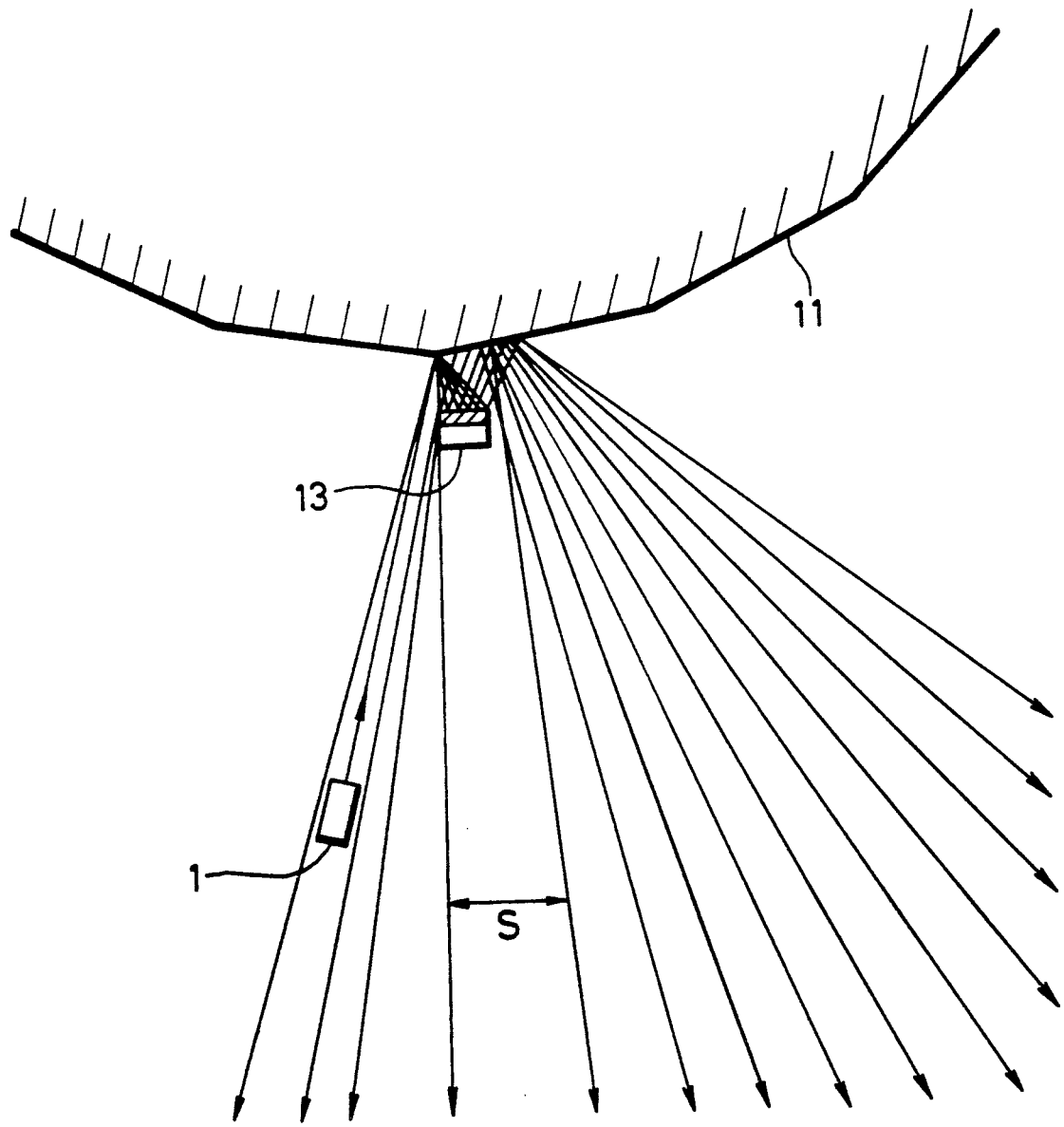
FIG. 5 is a schematic diagram showing how the laser beams are deflected by the reflecting portion according to a second prior art image display apparatus.

An image display apparatus according to a first embodiment of the present invention will hereinafter be described with reference to FIGS. 6 to 10. Throughout FIGS. 6 to 10, like parts corresponding to those of FIG. 1 are marked with the same reference numerals and therefore need not be described in detail.

Figure 6:
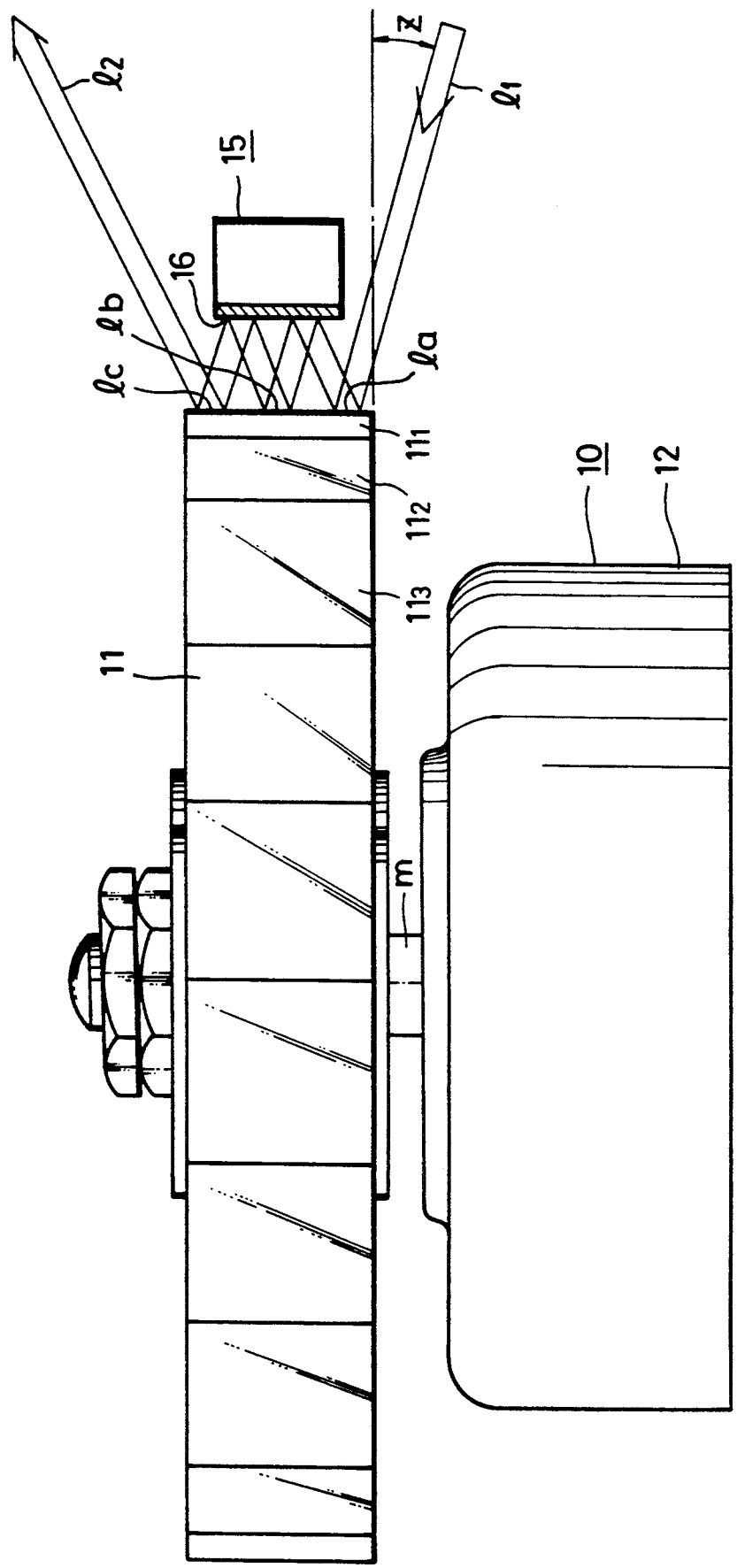
FIG. 6 is a front view illustrating a main portion of an image display apparatus according to a first embodiment of the present invention.

The image display apparatus of this embodiment is adapted to draw an image by the raster-scanning of the laser beam similarly to the prior-art laser display apparatus of the example shown in FIG. 1. FIG. 6 shows element portions near the polygon mirror 10, and other portions are formed similarly to those of FIG. 1.

In FIG. 6, reference numeral 10 generally designates the polygon mirror, and in this polygon mirror 10, the reflecting portion 11 is formed by arranging regular dodecahedron or 20 flat mirrors $11_1, 11_2, \ldots 11_{20}$ with an equal spacing in an annular-fashion. The reflecting portion 11 is rotated at high speed by a drive portion 12.

Figure 7:
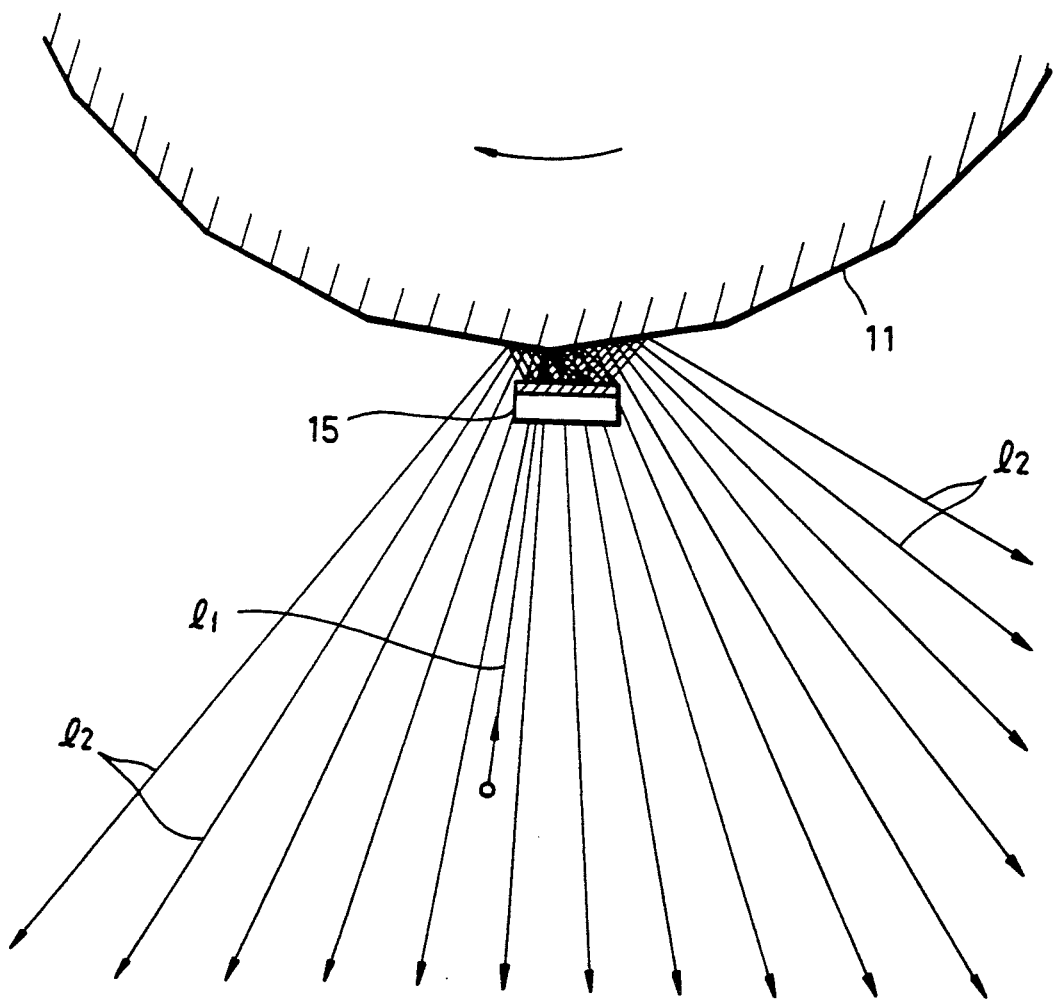
FIG. 7 is a schematic diagram showing how the laser beams are deflected by a reflecting portion of a polygon mirror, and to which reference will be made in explaining the operation of the first embodiment of FIG. 6.

In this embodiment, as shown in FIGS. 6 and 7, a fixed flat mirror 15 is located in an opposing relation to the reflecting portion 11 of the polygon mirror 10. In this case, a reflecting face 16 of the fixed flat mirror 15 is opposed to the side surface of the polygon mirror 10, and the fixed flat mirror 15 and the polygon mirror 10 are located in a predetermined positional relationship which will be explained later. A laser beam (1, modulated in intensity, is made incident on the reflecting portion 11 from the direction a little lower than the reflecting portion 11 of the polygon mirror 10. Assuming that m is the center of the rotating axis of the polygon mirror 10, then the laser beam 11 will become incident on the reflecting portion 11 at a very small elevation angle z relative to a rotational imaginary plane which is perpendicular to the center m of the rotating axis. Then, as shown in FIG. 6, this laser beam 11 is repeatedly reflected between the predetermined plane of the reflecting portion 11 and the fixed flat mirror 15, whereby the laser beam 11 is reflected three times at three points of points 1a, 1b and 1c of the reflecting portion 11 and is reflected twice on the fixed flat mirror 15. Consequently, a laser beam 12, to be supplied to the succeeding light path of a projection lens or the like, is obtained from the point 1c.

The positional relationship among the polygon mirror 10, the fixed flat mirror 15 and the incident beam 11 will be explained with reference to FIG. 8.

Figure 8:
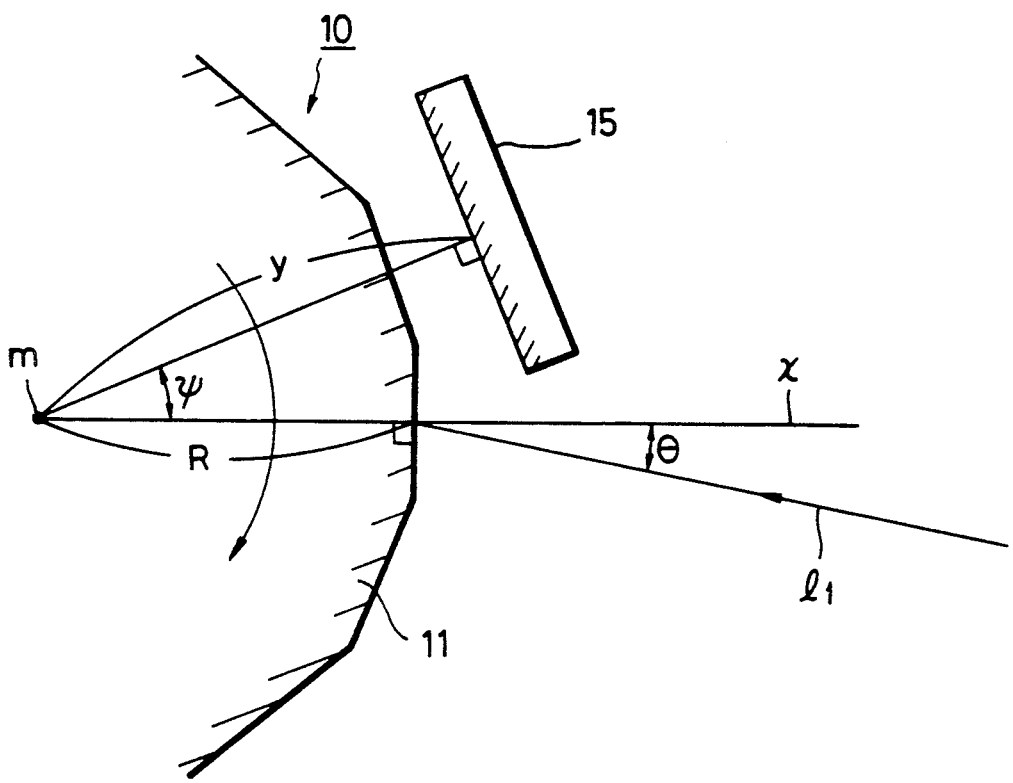
FIG. 8 is a schematic view to which reference will be made in explaining the positional relationship among a polygon mirror, a fixed flat mirror and an incident light beam.

As shown in FIG. 8, x assumes a reference direction which is the direction of normal on each plane or the reflecting portion 11 of the polygon mirror 10 when the incident beam 11 becomes incident on the center of each plane. $\theta°$ is the angle formed between the reference direction x and the incident light beam 11, $\psi°$ is the angle formed between the reference direction x and the normal on the fixed flat mirror 15, R is the radius of an inscribed circle of the reflecting portion 11 of the polygon mirror 10, N is the number of planes or flat mirrors forming the reflecting portion 11 of the polygon mirror 10 and y is the shortest length from the center m of the rotating axis of the polygon mirror 10 to the fixed flat mirror 15. Then, the following equations (1) to (6) are calculated:

$$\psi_0 = -\theta \times \left(1 - \frac{55}{N^2}\right) \quad (1)$$

$$y_0 = 1.51 \times \left(1 - \frac{1.18}{10000} \times \theta^2\right) \times R \quad (2)$$

$$\psi_1 = \frac{1}{50} \times \left(9 - \frac{3}{10} \times \theta\right) \times N - \left(28 + \frac{3}{10} \times \theta\right) \quad (3)$$

$$y_1 = R \quad (4)$$

$$\psi_2 = -\frac{1}{50} \times \left(9 + \frac{3}{10} \times \theta\right) \times N + \left(28 - \frac{3}{10} \times \theta\right) \quad (5)$$

$$y_2 = R \quad (6)$$

where $N \geq 8$.

Figure 9:
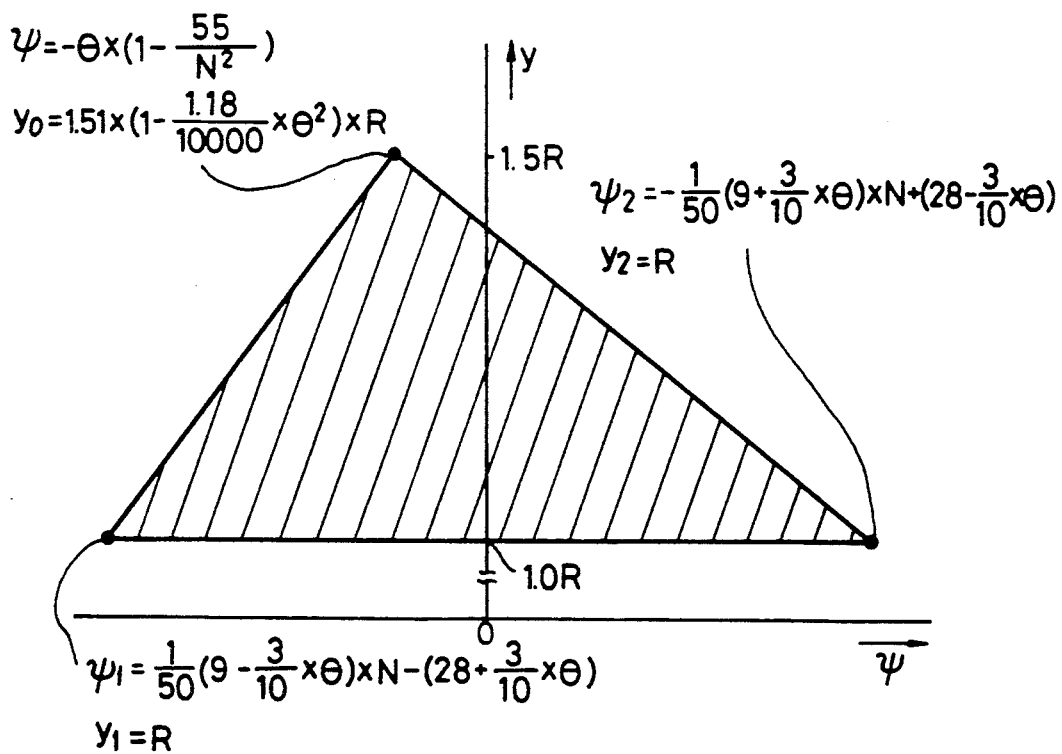
FIG. 9 is a coordinate diagram used to explain the operation of the first embodiment of the present invention.

Then, as shown in FIG. 9, let us consider a coordinate in which $\psi$ and y are formed as orthogonal axes. The coordinates of three points $[\psi_0, y_0]$, $[\psi_1, y_1]$ and $[\psi_2, y_2]$ are calculated from the equations (1) to (6), and the respective values are selected so as to fall within a range of a triangle encircled by the above-mentioned three coordinates.

Figure 10:
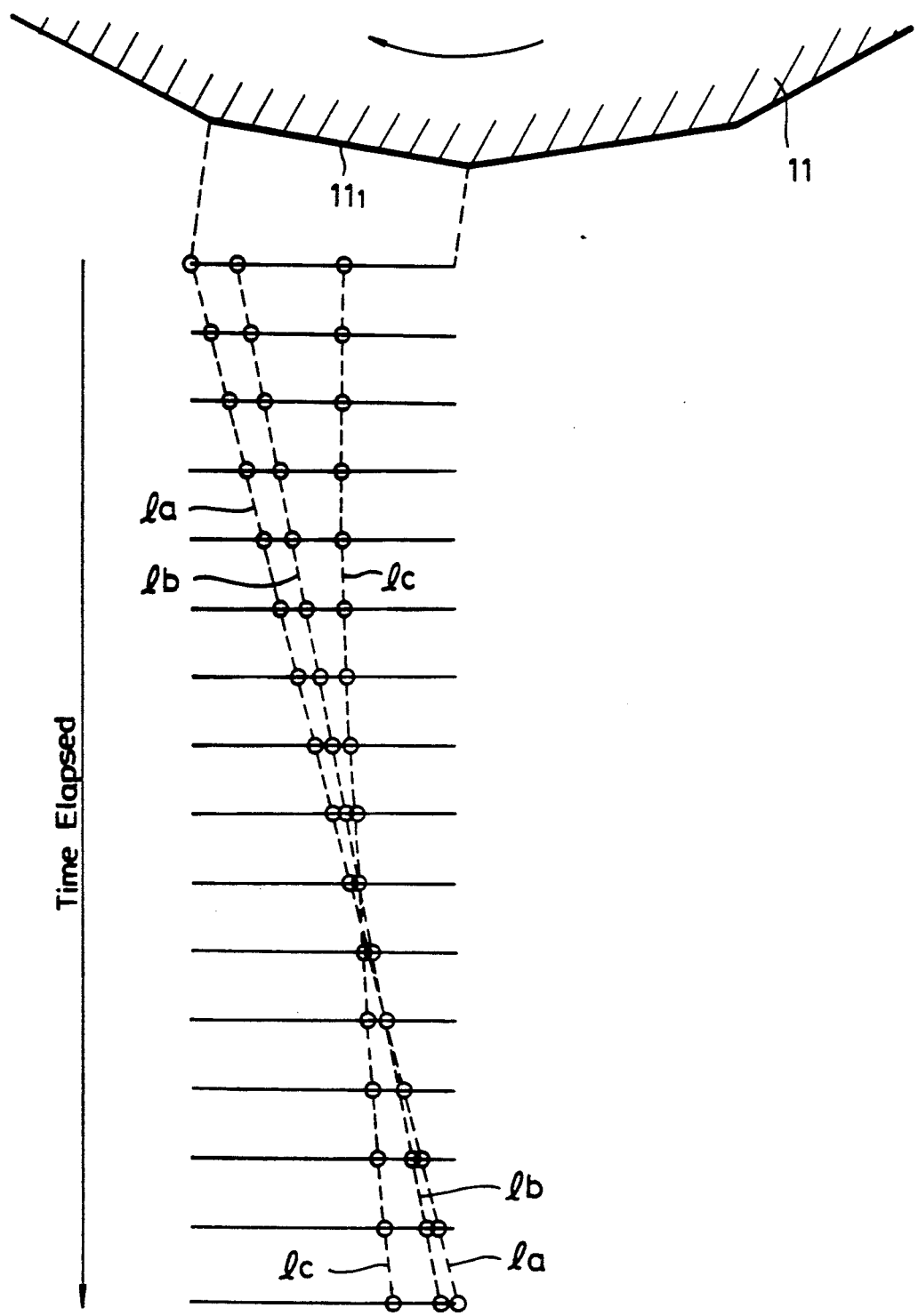
FIG. 10 is a schematic diagram of the loci of the incident points of a laser beam and how they are changed with time, in the operation of the first embodiment of the present invention.

If the respective values are selected as described above, the loci of three incident points 1a, 1b and 1c of the laser beam 11 incident on the predetermined plane (for example, the flat mirror $11_1$) of the reflecting portion 11 are changed as shown in FIG. 10. More specifically, when the primary incident point 1a is located at one end portion of the flat mirror $11_1$, the secondary and ternary incident points 1b and 1c are located near the other end portion of the flat mirror $11_1$. Due to the rotation of the polygon mirror 10, the primary incident point (a is sequentially moved toward the other end of the flat mirror $11_1$ during elapse of time, and passes the secondary and ternary incident points 1b and 1c. When the primary incident point 1a is located at the other end portion of the flat mirror $11_1$, the secondary and ternary incident points 1b and 1c are located near one end portion of the same flat mirror $11_1$ as compared with the primary incident point 1a.

Thus, when the primary incident point 1a is on the flat mirror $11_1$, the secondary and ternary incident points 1b and 1c are also located on the same flat mirror $11_1$, thereby obtaining a light beam 12 which is continuously deflected. In this embodiment, the reflecting portion 11 of the polygon mirror 10 is formed of the regular icosahedron or 20 planes so that, while when the fixed flat mirror 15 is not provided, the deflection angle of one plane is presented as $(360/20) \times 2 = 36°$, the same laser beam becomes incident on the reflecting portion three times, whereby the deflection angles are extended twice at the secondary and ternary incident points, respectively, thus increasing the total deflection angle to $36 \times 2 \times 2 = 144°$.

As described above, the deflection angle can be increased to four times the deflection angle according to the prior art, whereby the left to right deflection angle of the image displayed on the screen 9 as shown in FIG. 1 can be increased. When the size of the screen 9 is selected to be the same as that of the prior art and the deflection angle is also selected to be the same as that of the prior art, even though the width of each plane is decreased by increasing the number of planes of the reflecting portion 11 of the polygon mirror 10, the deflection angles of the respective planes can be increased to make the total deflection angle same as that of the prior art. Therefore, the rotation speed of the polygon mirror 10 can be decreased by the revolution rate corresponding to the increased number of planes. For example, while the polygon mirror 10 has to be rotated at about 80000 r.p.m. in the prior art, according to this embodiment, the polygon mirror 10 can be rotated at about 20000 r.p.m., thereby considerably alleviating the loads imposed on the drive motor and the bearing. For example, the drive motor can be made compact in size and the expensive air bearing can be replaced with bearings such as standard ball bearings or the like.

Figure 11:
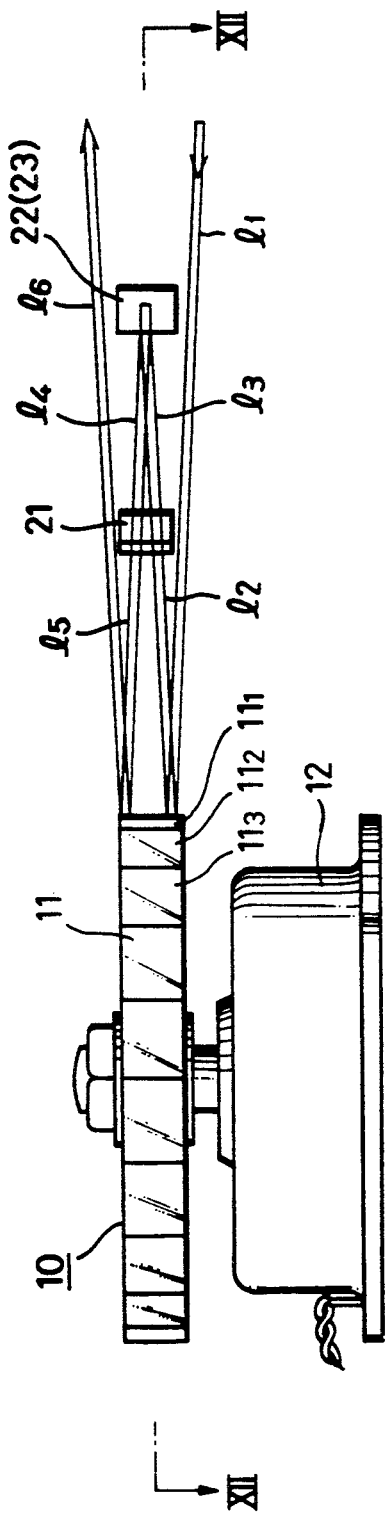
FIG. 11 is a schematic front view illustrating a main portion of the image display apparatus according to a second embodiment of the present invention.
Figure 12:
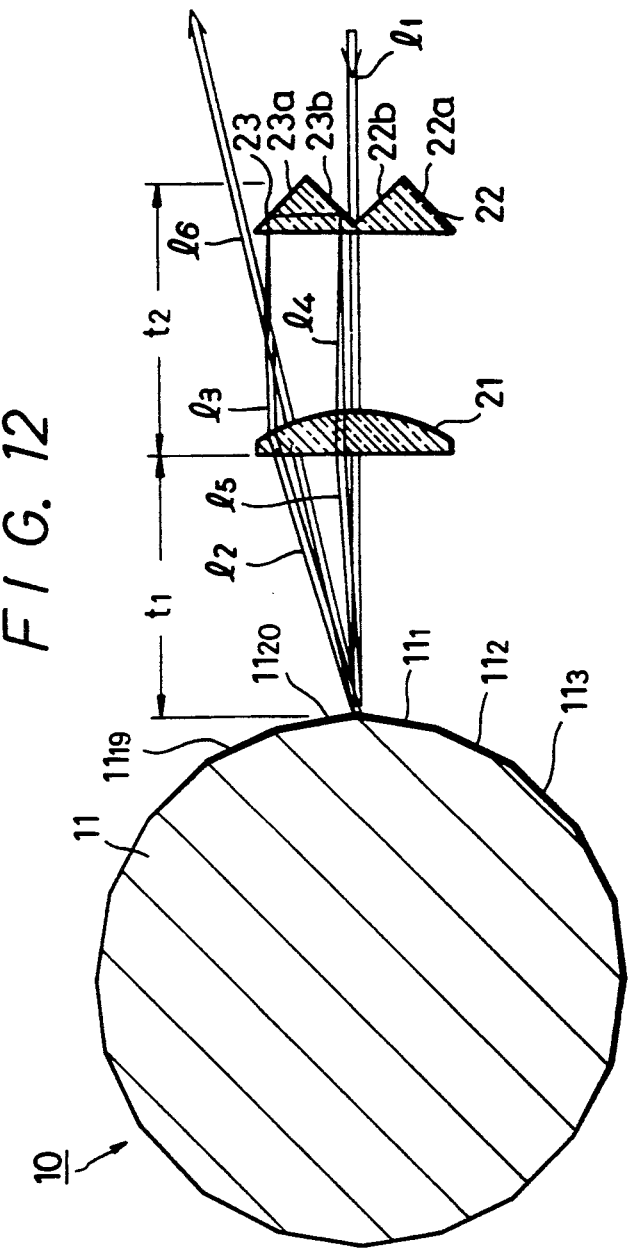
FIG. 12 is a cross-sectional view taken through the line XII to XII of FIG. 11.

FIGS. 11 and 12 are diagrams to which reference will be made in explaining the position in which a laser beam deflecting apparatus is opposed to the polygon mirror 10 in a second embodiment of the present invention. In this embodiment, a laser display apparatus displays an image by the raster-scanning of laser beam similarly to the laser display apparatus of the example shown in FIG. 1. Other portions are formed similar to those of FIG. 1.

In FIG. 11, it will be seen that the polygon mirror 10 is comprised of the reflecting portion 11 and the drive portion 12. The reflecting portion 11 is formed by locating a dodecaheron of 20 flat mirrors $11_1, 11_2, \ldots 11_{20}$ in an annular fashion, and the reflecting portion 11 is rotated by the drive portion 12.

In this embodiment, the laser beam (1, adjusted or modulated in intensity, is made incident on the respective flat mirrors $11_1, 11_2, \ldots 11_{20}$ of the reflecting portion 11 with a very small rising inclination angle from the downward direction. A reflected laser beam 12, which is the laser beam 11 incident on the reflecting portion 11, is formed so as to spread in fan shape at every flat mirrors $11_1, 11_2, \ldots 11_{20}$ in accordance with the rotation of the reflecting portion 11. A cylindrical lens 21 to convert a fan-shaped light path to a parallel light path is located at the position to which the reflected laser beam 12 reaches. This cylindrical lens 21 has one curved plane of a fan shape for converting the fan-shaped reflected laser beam 12 incident thereon from the polygon mirror 10 to a parallel laser beam (3. In this case, it is to be noted that a distance t1 between the laser beam reflecting surface of the reflecting portion 11 and the cylindrical lens 21 is selected to be equal to a focal length f0 of the cylindrical lens 21.

Reflecting prisms 22 and 23 are located at the position to which the parallel laser beam emitted from the cylindrical lens 21 reaches. The reflecting prisms 22 and 23 are the same in shape and respectively include reflecting faces 22a, 22b and 23a, 23b. The reflecting faces 22a, 22b and 23a, 23b are respectively displaced from each other by 90 degrees, and the parallel laser beam 13 becomes incident on the reflecting faces 22a, 22b and 23a, 23b at an angle of 45 degrees. The location of the reflecting prisms 22 and 23 will be explained more fully with reference to FIG. 12 forming a top view of a section taken through the line XII—XII in FIG. 11.

As shown in FIG. 12 which illustrates the top of the polygon mirror 10, the reflecting prisms 22 and 23 are located in such a fashion that when the reflected laser beam 12 is deflected in the direction lower than the incident laser beam 11 (this direction will be referred to as a + direction, hereinafter), the parallel laser beam 13 becomes incident on the reflecting prism 22, whereas when the reflected laser beam 12 is deflected in the direction higher than the incident laser beam 11 (this direction will be referred to as a − direction, hereinafter), the parallel laser beam 13 becomes incident on the reflecting prism 23. In this case, a length t2 between the cylindrical lens 21 and vertexes of the reflecting faces 22a, 22b and 23a, 23b of the prisms 22 and 23 is selected to be equal to the focal length f0 of the cylindrical lens 21. Accordingly, the laser beam, converged by the cylindrical lens 21, forms a smallest beam spot within the reflecting prism 22 or 23.

With the above-mentioned arrangement, the parallel laser beam 13 incident, for example, on the reflecting prisms 22 and 23 is again made incident on the cylindrical lens 21. More specifically, as shown in, for example, FIG. 12, the parallel laser beam 13, changed in direction 90 degrees by the reflection on the reflecting face 23a of the reflecting prism 23, is reflected one more time on the reflecting face 23b, changed in direction another 90 degrees and returns to the cylindrical lens 21 as a reflected-back parallel laser beam 14.

This reflected-back parallel laser beam 14 is again made incident on the cylindrical lens 21 which converted the fan-shaped light path 2 to the parallel light path 3, from the opposite direction so as to become a fan-shaped return laser beam 15 whose beam angle changes in response to the incident position thereof in the fan-shaped fashion. This return laser beam 15 is made incident on the reflecting portion 11 of the polygon mirror 10 one more time. The position in which the reflected-back laser beam 15 becomes incident on the reflecting portion 11 is the same as that of the laser beam 11. A laser beam 16, which results from reflecting the return laser beam 15 on the reflecting portion 11 one more time, travels above the cylindrical lens 21 and the reflecting prisms 22 and 23 to the projection lens (see FIG. 1).

Figure 13:
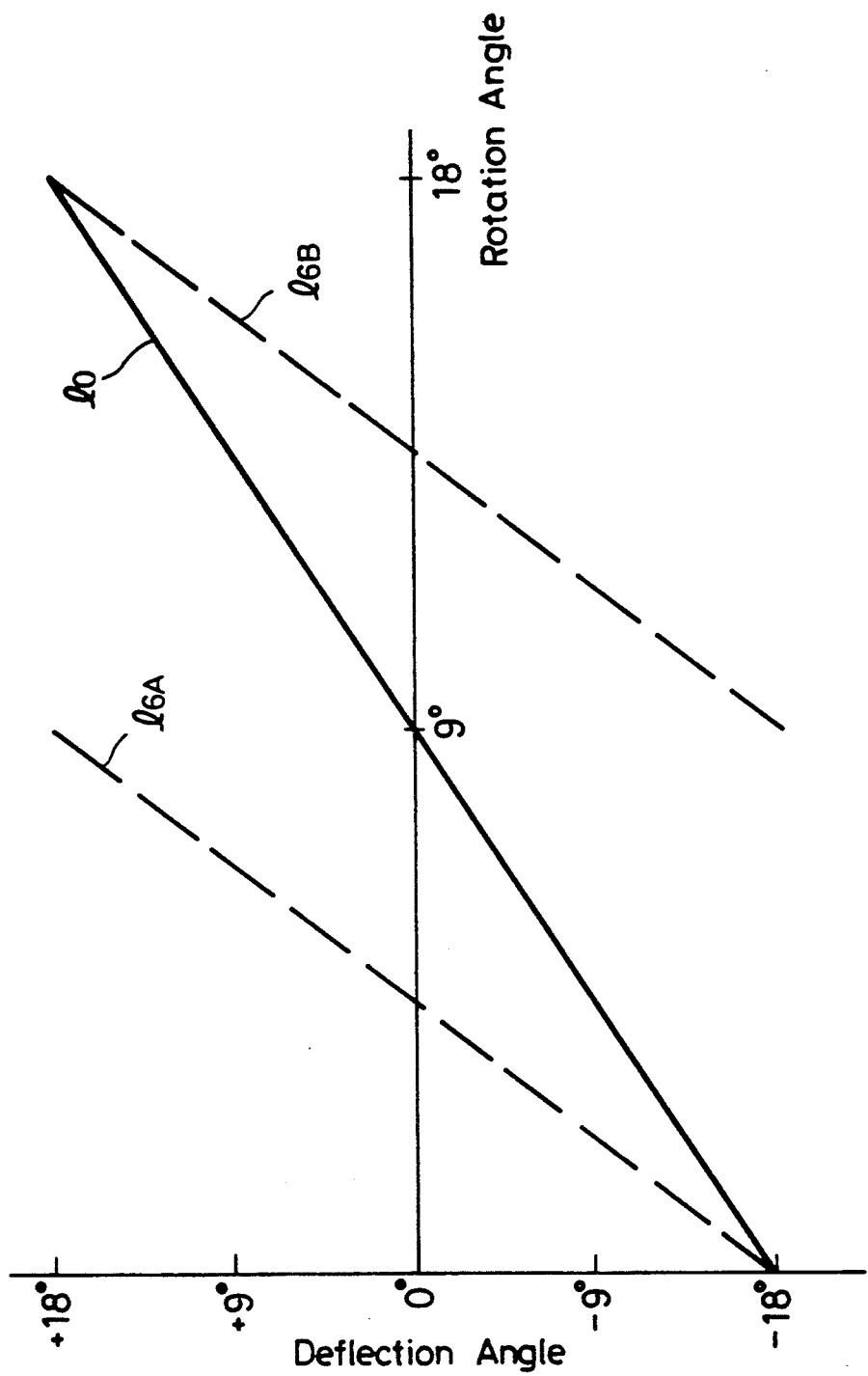
FIG. 13 is a graph showing how laser light beams incident on the polygon mirror of the second embodiment are deflected in the second embodiment of the invention.

FIG. 13 shows how the laser beams, incident on the polygon mirror 10 of this embodiment, are deflected.

A case where the cylindrical lens 21 and the reflecting prisms 22 and 23 are not provided is first explained. In this case, the reflecting portion 11 of the polygon mirror 10 is formed of 20 flat mirrors $11_1$ to $11_{20}$, whereby the reflecting portion 11 is moved by the width of each of the flat mirrors $11_1$ to $11_{20}$ when the polygon mirror 10 is rotated by 18 degrees. A laser beam 10, reflected when the polygon mirror 10 is rotated by 18 degrees, is deflected in the − direction by 18 degrees, and is also deflected in the + direction by 18 degrees. Thus, the laser beam 10 is deflected by a total deflection angle of 36 degrees by one of the flat mirrors $11_1$ to $11_{20}$.

On the other hand, the cylindrical lens 21 and the reflecting prisms 22 and 23 are provided in the embodiment shown in FIG. 11, whereby the laser beam is one more time made incident on the polygon mirror 10 with a different incident angle. As shown in FIG. 13, a laser beam 16A, finally emitted from the reflecting portion 11, is deflected in the + and − directions by 18 degrees each, i.e. a total deflection angle of 36 degrees each time the reflecting portion 11 is rotated by 9 degrees. Thus, when the reflecting portion 11 is rotated by 18 degrees which corresponds to the width of each one of the flat mirrors $11_1$ to $11_{20}$, a laser beam 16B is deflected by the deflection angle of 36 degrees after the laser beam 16A is deflected.

The conditions of the laser beams will be explained. The laser beam 12 reflected first on the polygon mirror 10 is deflected in the − direction. When the laser beam travels the inside of the reflecting prism 23, the laser beam 16A is emitted from the reflecting portion 11. Further, the laser beam 12 is deflected in the + direction. When the laser beam travels the inside of the reflecting prism 22, the laser beam 16B is emitted from the reflecting portion 11.

Next, consider the condition of the laser beam where the laser beam passes through the inside of, for example, the reflecting prism 23.

The parallel laser beam 13 becomes incident on the outside reflecting face 23a of the prism 23. When the primary deflection angle (the deflection angle of the laser beam 12) is large, the reflected-back laser beam 14 is emitted from the inside reflecting face 23b, reducing the angle at which the laser beam becomes incident on the polygon mirror 10. Conversely, when the primary deflection angle is small, the parallel laser beam 13 becomes incident on the inside reflecting face 23b of the prism 23, and the reflected-back laser beam 14 is emitted from the outside reflecting face 23a, enlarging an angle at which the reflected-back laser beam 4 becomes incident on the polygon mirror 10. As a result, the incident angle in which the laser beam 14 is again made incident on the polygon mirror 10 is changed in the opposite direction to the direction in which the reflecting portion 11 of the polygon mirror 10 is moved. Thus, the deflection angle is doubled. This is also true for a case where the laser beam becomes incident on the reflecting prism 22. The range in which the emitted laser beam 16A is deflected when the laser beam becomes incident on the prism 23 is exactly the same as the range in which the emitted laser beam 16B is deflected when the laser beam becomes incident on the prism 22.

Therefore, according to the image display apparatus of this embodiment, if the rotation speed of the polygon mirror 10 is selected to be the same as that in the prior art, then the deflection at the same deflection angle will be performed twice as many times as in the prior art. If the number of deflections is selected to be the same as those in the prior art, then the rotation speed of the polygon mirror 10 may be decreased, thus making it unnecessary to use the special motor, bearing and the like for rotating the polygon mirror at very high speed. Alternatively, if the rotation speed of the polygon mirror 10 is selected to be the same as that in the prior art, then the number of flat mirrors may be reduced, thus making it possible to reduce the diameter of the reflecting portion 11 of the polygon mirror 10 or to increase the width of each of the flat mirrors.

Further, according to this embodiment, since the length t2 between the cylindrical lens 21 and the vertexes of the prisms 22 and 23 is selected to be equal to the focal length f0 of the cylindrical lens 21 so that the beam spot of the laser beam becomes smallest at the vertexes of the prisms 22 and 23, it becomes possible to considerably reduce the time in which the laser beam can not be correctly reflected because the laser beam (3 is located at the vertexes of the reflecting prisms 22 and 23.

Furthermore, since the same flat mirrors $11_1$ to $11_{20}$ are utilized for the beams between the laser beams 16A and 16B finally emitted from the polygon mirror 10, it is possible to avoid a so-called eclipse from being produced on a boundary portion between the flat mirrors. Thus, the duration of a valid period can be extended. In this case, the invalid period of the boundary portion between the emitted laser beam 16A and the preceding laser beam and an invalid period of the boundary portion between the emitted laser beam 16B and the succeeding laser beam can also be reduced by displacing the incident angle of the incident laser beam 11 by a very small amount by the use of an acoustooptical element or the like.

Figure 14:
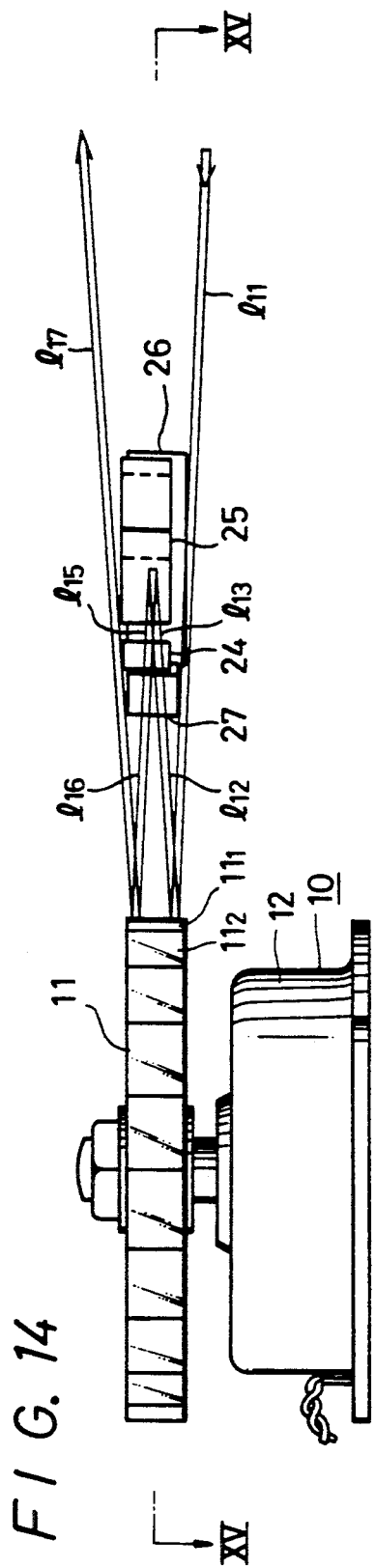
FIG. 14 is a schematic front view illustrating a first modified example of the second embodiment of the present invention.
Figure 15:
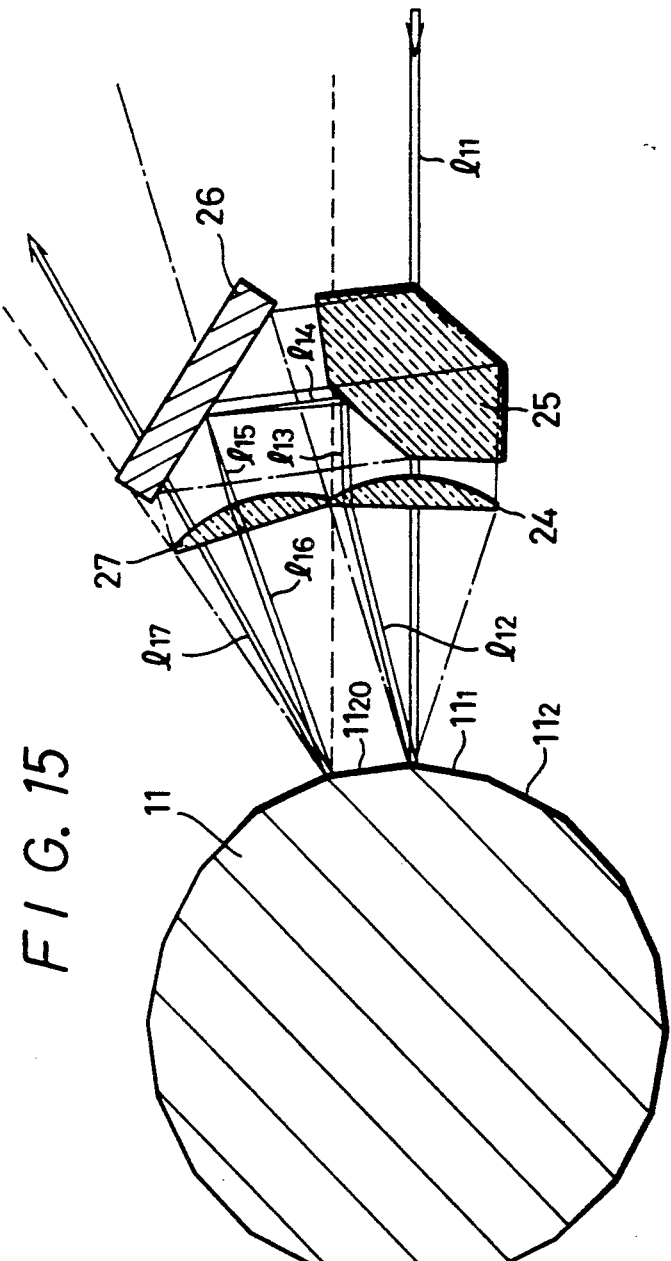
FIG. 15 is a cross-sectional view taken through the line XV to XV of FIG. 14.

A first modified example of the above-noted second embodiment of the present invention will be explained with reference to FIGS. 14 and 15. In FIGS. 14 and 15, like parts corresponding to those of FIGS. 11 and 12 are marked with the same references and therefore need not be described in detail.

In the first modified example, as shown in FIGS. 14 and 15, a laser beam 111, intensity-modulated, is made incident on the respective flat mirrors $11_1$ to $11_{20}$ of the reflecting portion 11 at a very small rising inclination angle from the downward direction. A first cylindrical lens 24 is located at the position to which a reflected laser beam 112, resulting from deflecting the incident laser beam 111 on the reflecting portion 11, reaches. The first cylindrical lens 24 is formed similar to the cylindrical lens 21 in FIGS. 11 and 12 and is therefore operated to convert a fan-shaped light path to a parallel light path. In this case, let it be assumed that the laser beam 111 is incident, for example, on the flat mirror $11_1$ of the reflecting portion 11. Then, a laser beam 113, converted as a collimated beam by the cylindrical lens 24, is reflected by a beam splitting and reflecting block 25. This beam splitting and reflecting block 25 is adapted to reflect on the surface thereof the laser beam 113, which results from converting the reflected laser beam 112 deflected in the − direction by the cylindrical lens 24, by a predetermined angle, and is also adapted to reflect the laser beam 113, which results from converting the reflected laser beam 112 deflected in the + direction by the cylindrical lens 24, within the prism by a predetermined angle. The directions in which the laser beams 113 are refracted are determined to be the same.

All laser beams, refracted by the beam splitting and reflecting block 25, are refracted one more time by a flat mirror 26 to provide a refracted laser beam 115. This laser beam 115 is introduced into a second cylindrical lens 27 for converting a parallel light path to a fan-shaped light path. This second cylindrical lens 27 is adapted to convert the parallelly-moving laser beam 115 into a laser beam 116 of the fan-shaped light path. This laser beam 116 is introduced into the flat mirror $11_{20}$ adjoining the flat mirror $11_1$ on which the laser beam 111 becomes incident, thereby providing a reflected laser beam 117 which is introduced to the projection lens (see FIG. 1).

With the above-mentioned arrangement, the double deflection shown in FIG. 13 can be obtained similarly to the embodiment of FIG. 11. In the modified example of FIG. 14, the primary incident laser beam and the re-flected-back incident laser beam are made incident on the different adjacent flat mirrors of the polygon mirror 10, so that the rectangular prisms shown in the embodiment of FIG. 11 are not needed. Therefore, during one deflection scanning, an invalid period is not produced by loss of the reflection of the laser beam. Thus, the image displayed by the raster-scanning of the deflected laser beam is not affected by the invalid time period.

A second modified example of the second embodiment of the present invention will be explained with reference to FIGS. 16 and 17.

In the second modified example, a laser beam, intensity-modulated, is made incident on the flat mirrors $11_1$ to $11_{20}$ of the reflecting portion 11 at a very small rising inclination angle from the downward direction. A first paraboloid mirror 28 is adapted to convert a fan-shaped light path to a parallel light path and is located at the position to which a reflected laser beam 122, resulting from reflecting the incident laser beam 121 by the reflecting portion 11, reaches. In this case, let it be assumed that the laser beam 121 is incident, for example, on the flat mirror $11_1$ of the reflecting portion 11. The first paraboloid mirror 28 is adapted to convert the fan-shaped light path to the parallel light path and is also adapted to reflect the laser beam 122 at substantially 90 degrees.

A laser beam 123, converted to a parallel beam by the first paraboloid mirror 28, is reflected by reflecting prisms 29a and 29b. The two reflecting prisms 29a and 29b are each adapted to refract the laser beam 123 by 90 degrees in the same direction. These prisms 29a and 29b are adapted to refract the laser beam 123 in the form of two split laser beams to provide a laser beam 124 in which the deflection beam in the − direction and the deflection beam in the + direction of the primary incident beam introduced into the polygon mirror 10 are arranged in the opposite sequential order. This laser beam 124 is reflected by a flat mirror 30 by 90 degrees, and a reflected laser beam 125 is introduced into a second paraboloid mirror 31 for effecting the parallel light path to the fan-shaped light path conversion. This paraboloid mirror 31 is provided to convert the parallel laser beam 125 into a laser beam 126 of a fan-shaped light path. In that event, the laser beam 126 is deflected at an angle of nearly 90 degrees relative to the laser beam 125. This deflected laser beam 126 becomes incident on the flat mirror $11_{11}$ of the polygon mirror 10. A reflected laser beam 127 from the flat mirror $11_{11}$ is utilized as a laser beam which is introduced to the projection lens (see FIG. 1).

With the above-mentioned arrangement, the double deflection number shown in FIG. 13 can be obtained similarly to the embodiment of FIG. 11, and also, there is no invalid period which is caused by the non-reflection of the laser beam during the deflection scanning, similar to the example shown in FIG. 14.

In the second modified example of FIG. 16, the primary incident point and re-incident point on the polygon mirror 10 are displaced from each other by 180 degrees, whereby the direction in which the laser beam 121 becomes incident on the polygon mirror 10 from the laser light source and the direction in which the laser beam 127 is emitted to the projection lens (see FIG. 1) from the polygon mirror 10 can be made substantially the same. In the first and second modified examples of FIGS. 14 and 16, it is desirable that the relative positions of the primary incident point and the re-incident point on the respective flat mirrors of the polygon mirror 10 are coincident with one another.

A third embodiment of the present invention will be described next with reference to FIGS. 18 to 20. Also in this embodiment, the present invention can be applied to the laser display apparatus.

In this embodiment, the laser beam is deflected four times per rotation of one of the flat mirrors $11_1$ to $11_{20}$ of the polygon mirror 10. As shown in FIGS. 18 and 19, a laser beam 31, modulated in intensity, is made incident on the respective flat mirrors $11_1$ to $11_{20}$ of the reflecting portion 11 at a very small rising inclination angle from a downward position. A first cylindrical lens 32 is provided in order to convert a fan-shaped light path to a parallel light path, and is located at the position to which a reflected laser beam 132, which results from reflecting the incident laser beam 131 by the reflecting portion 11, reaches. A laser beam 133, converted as a parallelly-traveling laser beam by the cylindrical lens 32, is made incident on a first rectangular prism 33 having two reflecting faces. A reflected-back laser beam (34 emitted from the reflecting prism 33 is introduced into the first cylindrical lens 32 one more time, wherein it is converted to a laser beam 135 whose beam angle changes in the fan-shaped fashion. This laser beam 135 is introduced into the reflecting portion 11 of the polygon mirror 10. In that event, the incident point of the laser beam 31 and that of the laser beam 135 are selected to be the same.

Second, third, fourth and fifth cylindrical lenses 34a, 34b, 34c and 34d are provided in order to convert a fan-shaped light path into a parallel light path, and are located at the position to which a laser beam 136, which results from reflecting the laser beam 135 by the reflecting portion 11, reaches. The second to fifth cylindrical lenses 34a to 34d are formed the same in shape and are located at positions which are provided by equally dividing by four the angular range of the reflected laser beam 136. The cylindrical lenses 34a to 34d are adapted to convert the laser beam 136 to a parallel laser beam 137. Second, third, fourth and fifth rectangular prisms 35a, 35b, 35c and 35d, each having two reflecting faces, are located at the positions to which the laser beams 137 from the second to fifth cylindrical lenses 34a to 34d reach. The laser beam 137 is made incident on one of the second to fifth reflecting prisms 35a to 35d. Similarly to the reflecting prism of the embodiment shown in FIG. 11, the locations of the reflecting prisms 35a to 35d are selected so that the smallest beam spot is provided within each of the reflecting prisms, taking the focal lengths of the cylindrical lenses 34a to 34d into consideration. The laser beam 137 is reflected twice within the respective reflecting prisms 35a to 35d, and is returned to the second to fifth cylindrical lenses 34a to 34d as a laser beam 138. This laser beam 138 is introduced to the second to fifth cylindrical lenses 34a to 34d, in which it is converted into a laser beam 139 traveling on a light path whose beam angle changes in a fan-shaped fashion. The laser beam 139 thus converted is made incident on the reflecting portion 11 of the polygon mirror 10. The incident point of the laser beam 139 at this event is selected to be equal to those of the laser beams 131 and 135. A laser beam 140, reflected on the reflecting portion 11 is utilized as a laser beam that is led to the projection lens (see FIG. 1).

Figure 20:
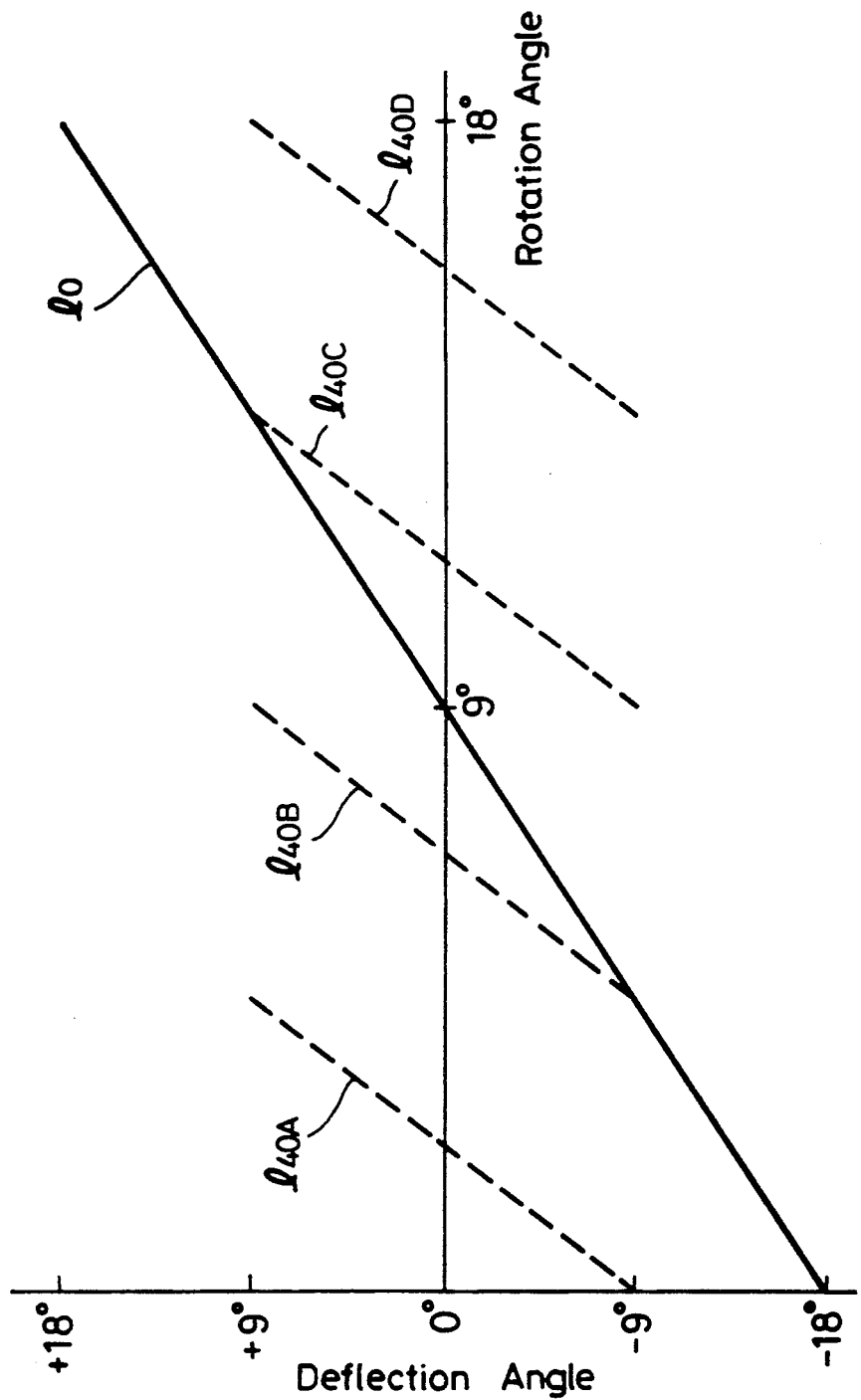
FIG. 20 is a graph showing how laser light beams incident on the polygon mirror of the third embodiment are deflected.

With the above-mentioned arrangement, the laser beam is deflected as shown in FIG. 20.

As shown in FIG. 20, the laser beams 131, 135 and 139 become incident on the reflecting portion 11 of the polygon mirror 10 a total of three times, increasing the number of deflections four times as compared with a reflected laser beam 10 provided where the cylindrical lenses 32, 34a to 34d and the prisms 33 and 35a to 35d are not provided. Thus, deflections are carried out four times for the reflected laser beams 140A, 140B, 140C and 140D on one of the flat mirrors 11₁ to 11₂₀. In this case, the total angle of four deflection angles is 72 degrees similarly to the embodiment of FIG. 11 so that one deflection angle becomes 18 degrees which is half of that of the embodiment of FIG. 11.

As described above, the number of deflection is increased four times in the third embodiment of FIG. 18, whereby the rotation speed of the polygon mirror 10 can be decreased considerably from, for example, 80000 r.p.m. to about 20000 r.p.m. Therefore, it becomes possible to considerably alleviate the loads of the drive motor, the bearing and the like for the polygon mirror 10.

Having described preferred embodiments of the invention with reference to the accompanying drawings in detail, it is to be understood that the present invention is not limited to those precise embodiments and that many changes and modifications could be effected by one skilled in the art without departing from the spirit and scope of the invention as defined in the appended claims.

We claim as our invention:

1. An image display apparatus comprising:
    (a) a light beam source for generating light beams;
    (b) modulation means for modulating said light beams by the image signals to be projected;
    (c) deflection means for deflecting said modulated light beams, said deflection means including polygon mirror means rotatable about an axis of rotation which is perpendicular to a rotational imaginary plane, and a plurality of mirror surfaces each being substantially perpendicular to the rotational imaginary plane, and auxiliary reflection means provided near said polygon mirror means such that the modulated light beams are reflected from said polygon mirror means to said auxiliary reflection means and back toward said polygon mirror means;
    (d) means for supplying said modulated light beans to said polygon mirror means, the modulated light beans being supplied obliquely relative to the rotational imaginary plane of the polygon mirror means, such that said modulated light beams incident upon said polygon mirror means are reflected at least three times by said polygon mirror means; and
    (e) projection means for projecting said modulated and deflected light beams from said deflection means on a screen or the like.

2. An image display apparatus as cited in claim 1, wherein said auxiliary reflection means includes a flat mirror.

3. An image display apparatus as cited in claim 1, wherein said auxiliary reflection means includes optical means for converting a fan-shaped light path into a parallel light path and reflecting means, said optical means being interposed between said polygon mirror means and said reflecting means.

4. An image display apparatus as cited in claim 3, wherein said optical means of said auxiliary reflection means includes a cylindrical lens and said reflecting means includes a reflecting prism.

5. An image display apparatus as cited in claim 3, wherein said optical means of said auxiliary reflecting means includes concave lens means.

6. An image display apparatus as cited in claim 3, wherein said reflecting means of said auxiliary reflecting means includes prism means for returning a reflected light beam parallel to an incident light beam.

7. An image display apparatus comprising:
    a. a light beam source for generating light beams;
    b. modulation means for modulating said light beams by the image signals to be projected;
    c. deflection means for deflecting said modulated light beams, said deflection means including polygon mirror means and auxiliary reflection means provided near said polygon mirror means such that the modulated light beams are reflected from said polygon mirror means to said auxiliary reflection means and back toward said polygon mirror means;
    d. means for supplying said modulated light beams to said polygon mirror means with a predetermined angle relative to a rotational plane of said polygon mirror means, such that said modulated light beams incident upon said polygon mirror means are reflected at least three times by said polygon mirror means; and
    e. projection means for projecting said modulated and deflected light beams from said deflection means on a screen or the like;
    wherein the auxiliary reflection means includes optical means for converting a fan-shaped light path into a parallel light path and reflecting means, the optical means being interposed between said polygon mirror means and said reflecting means;
    wherein the reflecting means of the auxiliary reflecting means includes prism means for returning a reflected light beam parallel to an incident light beam;
    wherein said prism means of the auxiliary reflecting means includes a first prism for a first deflection range of the modulated light beams from said polygon mirror means and a second prism for a second deflection range of the modulated light beams from said polygon mirror means.

8. An image display apparatus comprising:

a light beam source for generating light beams;

modulation means for modulating the light beams by image signals to be projected;

deflection means for deflecting the modulated light beams, including a polygon mirror and reflection means provided near the polygon mirror for reflecting the modulated light beams from the polygon mirror back toward the polygon mirror, wherein the reflection means includes prism means for returning a beam parallel to an incident beam, and an optical means interposed between the polygon mirror means and the prism means for converting a fan-shaped light path into a parallel light path;

means for supplying the modulated light beams to the polygon mirror means with a predetermined angle relative to a rotational plane of the polygon mirror means, such that the modulated light beams incident upon the polygon mirror means are reflected a plurality of times by the polygon mirror means; and projection means for projecting the modulated and deflected light beams from the deflection means onto a screen or the like.

9. An image display apparatus comprising:

a light beam source for generating light beams;

modulation means for modulating the light beams by image signals to be projected;

deflection means for deflecting the modulated light beams, including a polygon mirror and reflection means provided near the polygon mirror for reflecting the modulated light beams from the polygon mirror back toward the polygon mirror, wherein the reflection means includes two prisms which reflect a beam parallel to an incident beam, the first prism for a first deflection range of the modulated light beams from the polygon mirror and the second prism for a second deflection range of the modulated light beams from the polygon mirror, and an optical means interposed between the polygon mirror means and the prisms for converting a fan-shaped light path into a parallel light path;

means for supplying the modulated light beams to the polygon mirror means with a predetermined angle relative to a rotational plane of the polygon mirror means, such that the modulated light beams incident upon the polygon mirror means are reflected a plurality of times by the polygon mirror means; and projection means for projecting the modulated and deflected light beams from the deflection means onto a screen or the like.

10. The image display apparatus of claim 6, wherein said prism means of the auxiliary reflecting means includes a first prism for a first deflection range of the modulated light beams from said polygon mirror means and a second prism for a second deflection range of the modulated light beams from said polygon mirror means.

11. The image display apparatus of claim 1, wherein the modulated light beams are supplied to the polygon mirror means from below the auxiliary reflection means so that after the light beams have been repeatedly reflected between the polygon mirror means and the auxiliary reflection means to modulated light beams exit from above the auxiliary reflection means, wherein above and below are defined relative to the rotational imaginary plane of the polygon mirror means.

* * * * *